United States Patent [19]

Ringle

[11] 4,311,326
[45] Jan. 19, 1982

[54] ADAPTER FOR BLEEDING BRAKE LINES

[76] Inventor: Gerald D. Ringle, 3025 W. U.S. 12, Michigan City, Ind. 46360

[21] Appl. No.: 109,653

[22] Filed: Jan. 4, 1980

[51] Int. Cl.³ .............................................. F16L 3/00
[52] U.S. Cl. .................................... 285/62; 285/334.5
[58] Field of Search ...................... 285/334.5, 62, 9 R, 285/114, 61 (U.S. only)

[56] References Cited

U.S. PATENT DOCUMENTS

| | | | |
|---|---|---|---|
| 642,489 | 1/1900 | Pyke | 285/9 R X |
| 845,385 | 2/1907 | Wiest | 285/9 R X |
| 2,298,117 | 10/1942 | Franck | 285/334.5 X |
| 2,349,081 | 5/1944 | Douglass | 285/334.5 X |
| 3,826,522 | 7/1974 | Dawes | 285/9 R X |
| 4,230,109 | 10/1980 | Geiss | 285/114 X |

*Primary Examiner*—Thomas F. Callaghan
*Attorney, Agent, or Firm*—Marmaduke A. Hobbs

[57] ABSTRACT

An adapter for bleeding brake lines in which the adapter is used to connect the pressure bleeder directly to the brake line, thereby by-passing the master cylinder during the bleeding procedure. The brake line is held in a slot in the adapter body, and a threaded element is tightened against the end of the brake line. The pressure bleeder is connected to the element, and the brake fluid from the bleeder passes through the element and into the brake line. Flare fittings minimize leakage, and the element has a tapered end which will seat in the flared end of most conventional size brake lines.

4 Claims, 5 Drawing Figures

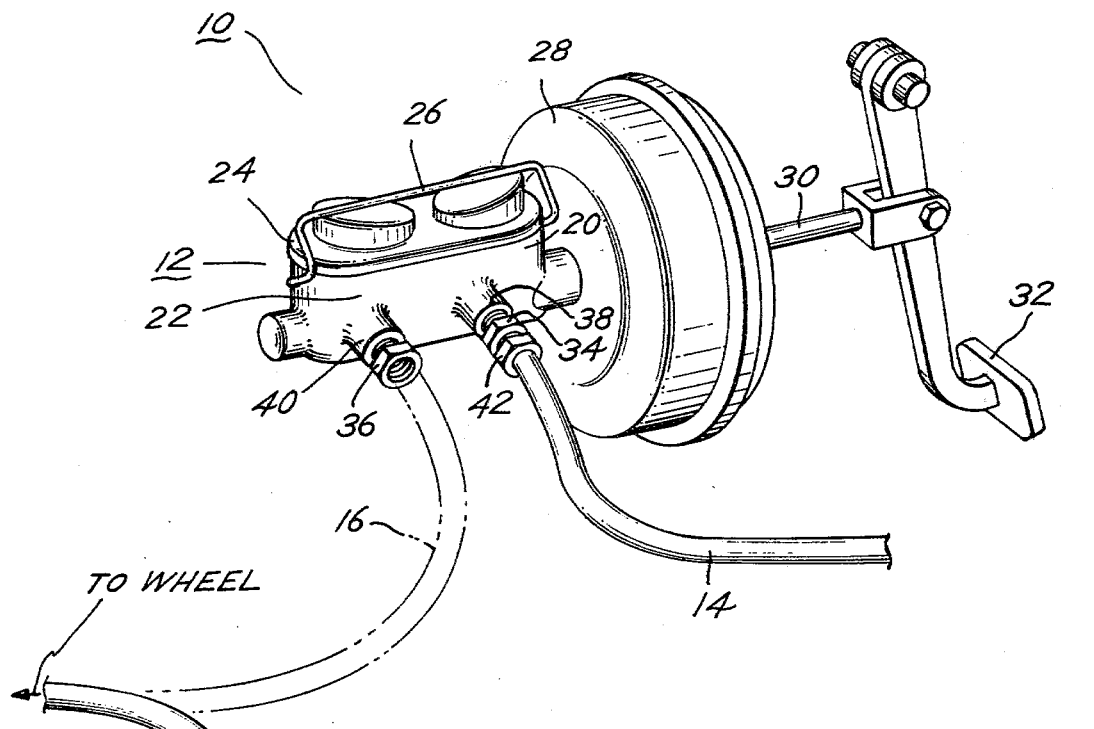
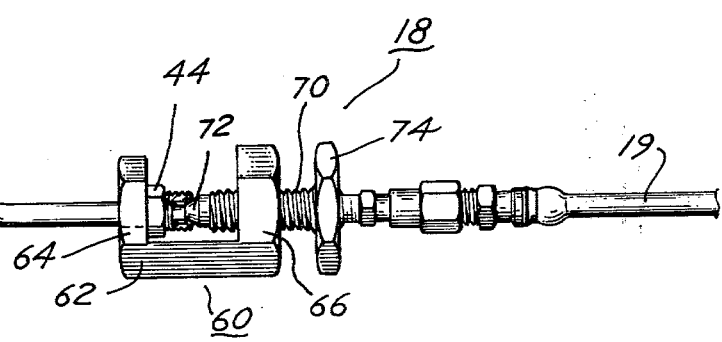
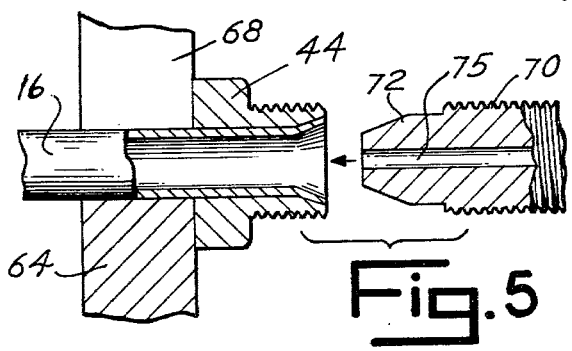

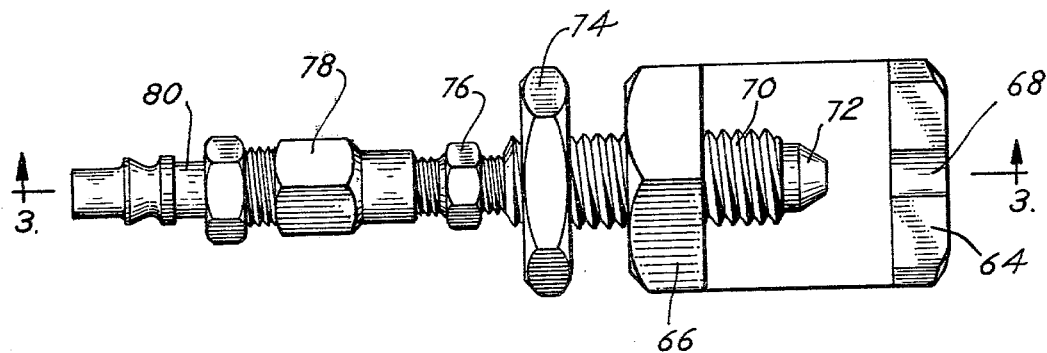
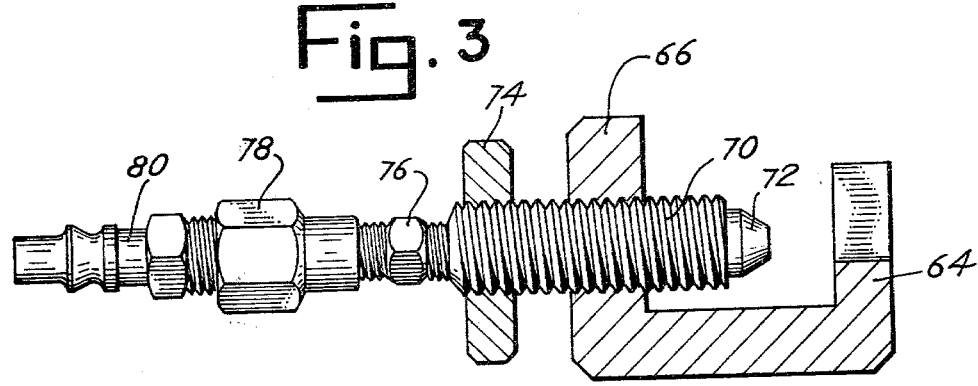
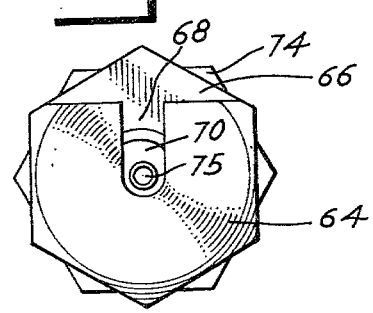

ADAPTER FOR BLEEDING BRAKE LINES

The brake systems of automobiles are normally hydraulically operated, thereby substantially minimizing the number of mechanical linkages and potential mechanical failure. The brakes at each wheel are activated by pressurized brake fluid supplied through brake lines from a master cylinder havng a fluid reservoir. If the fluid in the master cylinder is permitted to fall below the full level, or when the brakes are disassembled and the fluid drained from the lines and cylinders during servicing and repairing, air often gets into the system and, since air can be compressed whereas the hydraulic brake system operates because brake fluid cannot be compressed, malfunction of the brakes may result when air is present in the brake lines and cylinders. Hence, it becomes necessary to bleed the air out of the brake system to prevent failure of the brakes. For many years, siphon bleeding was the primary means used to bleed brake systems. Siphon bleeding is time consuming and requires two people to perform: one to pump and hold the brake pedal, and one to open and close the bleeder valves at each wheel and to add brake fluid to the master cylinder. To facilitate the bleeding of brake systems, pressure bleeders have been developed which supply pressurized brake fluid to the brake system through the master cylinder, thereby forcing any air in the system out through the bleeder valves. Since brake fluid is continuously supplied to the brake system, pressure bleeders are faster than siphon bleeding, and, since the brake pedal is not used to provide the pressure for bleeding, only one person is required to bleed a brake system with a pressure bleeder, thereby saving a substantial amount of labor hours in the brake bleeding operation.

The pressure bleeder is normally connected to the top of the master cylinder by removing the master cylinder cover and attaching an adapter in its place, with the pressure bleeder being attached to the adapter. The adapters used to connect the pressure bleeder to the top of the master cylinder frequently do not seat properly on the master cylinder housing, thereby permitting brake fluid to leak during the bleeding procedure. Improper seating can result if the adapter is connected to the master cylinder either too tightly or too loosely. In addition to creating an unnecessary mess in the engine compartment, the leakage resulting during the bleeding process wastes brake fluid which is a relatively expensive item in the brake system.

In most circumstances, it is unnecessary to bleed the master cylinder while it is on the automobile. If the master cylinder has not been permitted to run out of brake fluid, there will be no air in the master cylinder itself; hence, bleeding of the master cylinder is not required. If a new master cylinder is being installed on the automobile to replace a defective cylinder, the master cylinder is normally bled on the work bench before it is installed in the automobile. Bleeding the master cylinder before installing it on the automobile is substantially easier and quicker than bleeding the cylinder through the brake lines of the automobile. Since it normally is not necessary to bleed the master cylinder while it is on the automobile, an adapter which can connect the pressure bleeder directly to the brake line is preferable to the adapter which must connect the pressure bleeder to the master cylinder. Such an adapter not only eliminates the unnecessary bleeding of the master cylinder but also substantially minimizes the possibility of leakage from the pressure bleeder adapter connection, since the heretofore unsatisfactory connection to the top of the master cylinder is eliminated. Normally, the brake lines are connected to the master cylinder with flare type connections which are easily secured in a leak-proof manner. Hence, use of a flare type connection on the adapter for the pressure bleeder substantially minimizes any unnecessary brake fluid waste during the bleeding procedure.

It is therefore one of the principal objects of the present invention to provide an adapter for bleeding brake lines which eliminates unnecessary bleeding of the master cylinder, and which connects a pressure bleeder to the brake lines of the automobile, thereby by-passing the master cylinder.

Another object of the present invention is to provide an adapter for bleeding brake lines which has a flare type connection compatible with the flare type connections normally found on brake lines, and which substantially eliminates the possibility of unnecessarily losing brake fluid during the bleeding procedure by readily seating on the brake line, thereby reducing unnecessary expense in supplying any appreciable amount of new brake fluid.

A further object of the present invention is to provide an adapter for bleeding brake lines which can be attached quickly and easily to the brake line and the pressure bleeder, to connect the brake line effectively to the pressure bleeder for proper bleeding of the brake system, and which can be attached to brake lines of most makes of automobile brake systems.

Additional objects and advantages of the present invention will become apparent from the following detailed description and the accompanying drawings, wherein:

FIG. 1 is a perspective view of a portion of the brake system of an automobile showing the manner in which the adapter of the present invention is attached to the brake system;

FIG. 2 is a top plan view of the present adapter;

FIG. 3 is a cross sectional view of the adapter shown in FIG. 2, the section being taken on line 3—3 of the latter figure;

FIG. 4 is an elevational view of the end of the adapter, shown in the preceding figures, which is attached to the brake line of the automobile; and FIG. 5 is an enlarged fragmentary, partial cross sectional view showing the manner in which the adapter is used.

Referring more specifically to the drawings, and to FIG. 1 in particular, numeral 10 designates the brake activating system of a conventional automobile having a master cylinder 12 with brake lines 14 and 16 extending therefrom to the brake cylinders on the wheels of the automobile. Brake line 16 has been removed from master cylinder 12 and an adapter 18 embodying the present invention is shown attached to the brake line. Adapter 18 is connected by a suitable tube or fluid line 19 to a pressure bleeder (not shown).

Master cylinder 12 is a dual system master cylinder having a primary reservoir 20 and a secondary reservoir 22. The top of master cylinder 12 has a cover 24 which is seated thereon and held by a retainer or bail 26. A power brake vacuum unit 28 is activated by a push rod 30 from the brake pedal 32 in the interior of the automobile, and pressurizes the fluid in the master cylinder 12. The dual system brake mechanism shown in FIG. 1 is used for illustrative purposes only and, since the adapter 18 connects the pressure bleeder directly to the brake line and by-passes the master cylinder, the adapter works equally well on other types or designs of brake activating systems.

Normally, the brake lines 14 and 16 have flare type fittings to connect them in a leak-proof manner to the master cylinder. Internally threaded fittings 34 and 36 are disposed in the fluid output ports 38 and 40 of the primary and secondary reservoirs, respectively. Brake lines 14 and 16 have externally threaded securing fittings 42 and 44 which are slidable on the brake lines and are threaded into fittings 34 and 36 to secure the brake lines to the master cylinder. The male portion of the flare connection between the master cylinder and brake line is normally on the brake line, and the female portion is in fittings 34 and 36 on the master cylinder.

Adapter 18 includes an adapter body 60 which has a base 62 and end walls 64 and 66. Aluminum or other light weight metals are suitable materials for body 60. End wall 64 has a slot 68 therein which extends from the edge of the end wall downwardly toward base 62, and is of sufficient width to receive a brake line of any diameter typically found in automobile brake systems. The securing fitting on the brake line, such as shown at either 42 or 44 in FIG. 1, is larger than slot 68 and will remain on the inside of wall 64 when positioned there, and cannot slide through the slot. Wall 66 has a threaded opening therein for receiving a threaded attachment element 70 which is cylindrical in shape and has a tapered portion 72 on the inner end thereof, for seating in the end of the flare connections on brake lines of a variety of different sizes. The adapter of the present invention may be used equally well on brake lines of a variety of automobiles, or other devices and implements having pressure hydraulic lines. A hexagonally shaped plate member 74 is fixedly secured to the outer end of element 70, and can easily be grasped by hand or by conventional mechanic's tools for turning and moving element 70 farther into or out of body 60. Wall 66 of body 60 and/or wall 64 may also have the basic hexagonal configuration so that wrenches may be applied to both member 74 and body 60 to tighten the element 70 into the end of the brake line to be bled. Element 70 has an opening 75 longitudinally therethrough which communicates with the brake line opening when the element is tightened against the brake line. The end of element 70 opposite end 72 is internally threaded to receive appropriate connectors such as male union member 76, reducer 78 and snap connector 80 as needed, to connect the adapter to line 19 from the pressure bleeder. The union, reducer and connector shown may vary depending upon the line from the pressure bleeder being used and the attachment required.

In the use and operation of an adapter of the present invention, brake line 16 is disconnected from master cylinder 12 and is placed in slot 68 of adapter 18, with fitting 44 being positioned between walls 64 and 66 to prevent brake line 16 from being pulled outwardly through the slot. Member 74 is rotated to turn the tapered end 72 of element 70 into body 60 until the tapered end engages the flared end on brake line 16. Fitting 44 is seated firmly against wall 64 as element 70 is moved inwardly in body 60 and against brake line 16. To further seal the connection between element 70 and brake line 16, wrenches may be placed on member 74 and either of the end walls 64 or 66 to tighten the connection. The line 19 from the pressure bleeder is attached to snap connector 80, or to whatever connecting means is used, and the bleeding operation is ready to be performed. Pressurized brake fluid flows from the pressure bleeder, through line 19 and element 70, and into brake line 16 to force out any air present in the brake line. Upon completion of the bleeding of brake line 16, member 74 and element 70 are rotated to withdraw the element from body 60 until tapered end 72 is completely removed from the flare connection of the brake line. The brake line 16 may then be removed from slot 68 and reattached to the master cylinder and tightened in place. Brake line 14 may then be removed from master cylinder 12 and held in a similar manner to that just described for brake line 16, and is then bled as previously described.

It is clear from the preceding description that the adapter of the present invention eliminates the unnecessary bleeding of the master cylinder. Since the brake lines of the automobile have flare connections which provide leak proof connections when pressurized fluid is passed therethrough, element 70 of the adapter of the present invention forms a leak proof connection between the adapter and the brake line by seating in the flared end of the line. Hence, little, if any, brake fluid is wasted when the adapter is used to connect the pressure bleeder to the brake line. The end 72 of element 70 may be quite large, and the tapered design thereof allows element 70 to be seated in the flared end of brake lines of a variety of different sizes. Thus, the adapter of the present invention can be used on virtually all automobile brake systems regardless of the diameter of brake line used thereon.

Although one embodiment of my adapter for bleeding brake lines has been described in detail herein, various changes may be made without departing from the scope of the present invention.

I claim:

1. An adapter for connecting a flared end brake line at the master cylinder fitting to a pressure bleeder, comprising a rigid, generally U-shaped adapter body having a base and end walls extending outwardly from said base, a slot in one of said end walls extending from the edge of said one end wall toward said base, said slot being of a width greater than the diameter of the brake line but less than the diameter of the fitting on the brake line, a threaded element having a tapered end for seating in the flared end of a brake line and an internal passage therethrough, a means including a threaded hole disposed in the other of said end walls receiving said threaded element for moving the tapered end of said element into seating relation with the brake line and for retaining said element in seating relation with the brake line, and means for connecting said element to a pressure bleeder.

2. An adapter as defined in claim 1 in which a member is disposed on said element for rotating said element in said threaded hole.

3. An adapter as defined in claim 1 in which at least one of said end walls is of hexagonal shape and a member of hexagonal shape is disposed on said element for rotating said element in said threaded hole.

4. An adapter as defined in claim 1 in which said slot and said hole are opposite one another in their respective end walls, and said element is cylindrical in shape and said passage therein extends substantially the full length thereof.

* * * * *